M. J. WOHL & H. HERTZBERG.
ELECTRICAL MEASURING INSTRUMENT.
APPLICATION FILED MAR. 20, 1908.
950,647.
Patented Mar. 1, 1910.
Fig. 1.
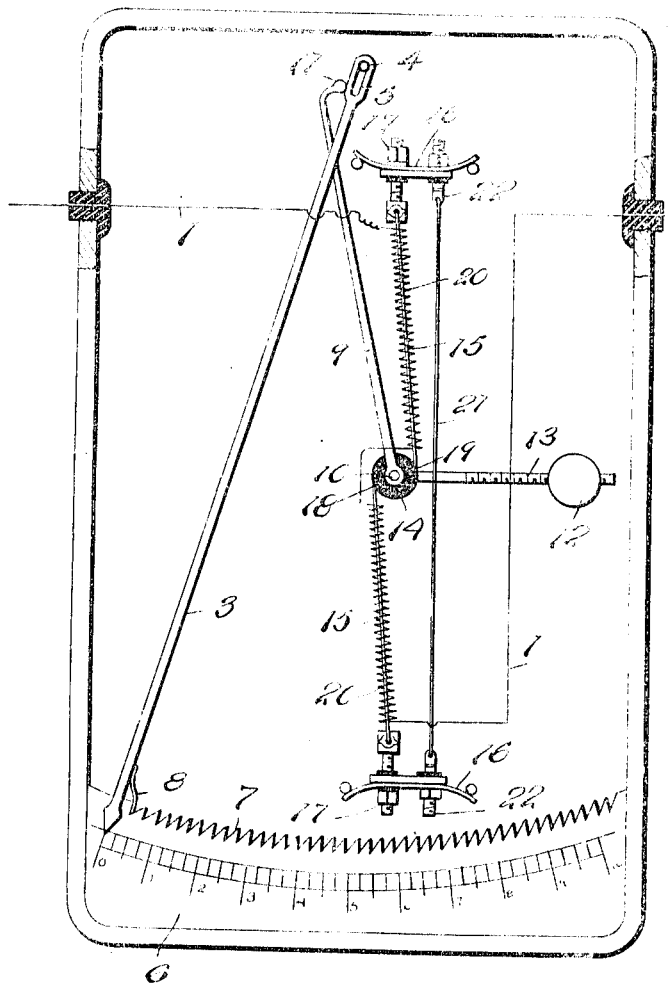
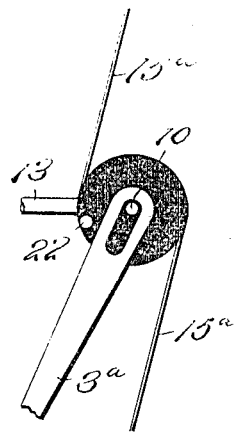
Fig. 2.
Witnesses:
Inventors
Maurice J. Wohl,
Harry Hertzberg,
By their Attorney Lewis J. Doolittle

UNITED STATES PATENT OFFICE.

MAURICE J. WOHL, OF NEW YORK, AND HARRY HERTZBERG, OF BROOKLYN, NEW YORK, ASSIGNORS TO ABBOT A. LOW, OF HORSESHOE, NEW YORK, MAURICE J. WOHL, OF NEW YORK, N. Y., AND HARRY HERTZBERG, OF BROOKLYN, NEW YORK, TRUSTEES.

ELECTRICAL MEASURING INSTRUMENT.

950,647.  Specification of Letters Patent.  Patented Mar. 1, 1910.

Application filed March 20, 1908. Serial No. 422,275.

*To all whom it may concern:*

Be it known that we, MAURICE J. WOHL and HARRY HERTZBERG, citizens of the United States, and residents, respectively, of the city of New York, borough of Manhattan, county and State of New York, and of the city of New York, borough of Brooklyn, county of Kings, and State of New York, have invented certain new and useful Improvements in Electrical Measuring Instruments, of which the following is a specification.

This invention relates to electrical measuring instruments, more particularly adapted for registering the maximum current flowing in a circuit.

Broadly, the invention consists in a circuit, a resistance-heated thermostat operated by the circuit, a movable indicator, and connection between the thermostat and indicator whereby the latter is actuated only through the expansion of the thermostat.

In the drawings, Figure 1 is a semi-diagrammatic elevation of an apparatus embodying the invention, and Fig. 2 is a partial view similar to Fig. 1, showing a modification.

Referring to these drawings, the numerals 1, 1 indicate a portion of an electrical circuit, and 2 any suitable casing for the instrument. Referring for the present to Fig. 1, 3 indicates a movable pointer or indicator, pivoted near its upper end to the pivot pin 4 projecting from the casing wall, the pivot aperture 5 of the indicator being slotted, to permit the indicator to move longitudinally. The lower end of the indicator travels over a graduated index plate 6, provided with an arcuate serrated upper edge 7. A pawl or detent 8 secured to the indicator 3 takes into the notches 7, to retain the index end of the indicator in apposition to the several graduations on the plate 6. This indicator 3 is shown as being actuated in one direction only by an operating member in the shape of an arm 9, pivoted toward its lower end at 10 to the casing, and having a projection 11, toward its upper end, which engages the side of the indicator 3 near the pivot thereof. It is obvious that movement of the arm 9 toward the right moves the indicator 3 to the right, but that movement of the arm to the left does not affect the indicator.

A suitable means for moving the arm 9 in the operative direction is indicated by the weight 12, which is adjustably mounted on the arm 13, rigid with the enlarged hub 14, of insulating material, of the arm 9.

The thermostat, the contraction of which operates to overcome the weight 12 and to move the arm 9 in the inoperative direction, is represented by the thermal wire 15, which is stretched between spring supports 16, to which its ends are connected by tension adjusting devices 17. Said wire 15 is connected intermediate its length, at 18 and 19, to the hub 14; being, thus, connected to the arm 9 that points at opposite sides of the pivot thereof, whereby contraction of the wire moves the arm 9 to the left and lifts the weight 12. It is obviously immaterial whether the wire 15 is in one length or two.

The wire 15 is heated by resistance coil 20 connected in series in the circuit 1, 1. But, in order to prevent changes in temperature, due to causes other than the electrical heating of coil 20, moving the arm 9, a compensating wire 21 is also stretched between the supports 16; its ends being connected thereto by tension adjusting devices 22. This wire is adapted to have the same total linear expansion per unit change in surrounding temperature as the wire 15; so that mere changes in atmospheric temperature result only in the wire 21 changing the flexure of the supports 16. Since the amount of change in flexure of the supports is, thus, the same as the total expansion or contraction of the wire 15, the outer ends of this wire suffer displacement under such conditions, but the points 18 and 19 do not; hence, the arm 9 is not shifted.

The operation will be apparent. The current passing in the circuit heats the resistance coil 20, which, in turn, heats the thermal wire 15. The expansion of this wire permits the weight 12 to descend, thus moving the arm 9 and the indicator 3. When the maximum current has been reached and the current begins to diminish, the indicator is held at the graduation representing this maximum, and the contraction of the wire 15, due to the cooling of the coil 20, lifts the weight 12 and moves the arm 9 in the inoperative direction. It will be observed that the slotted pivot of the indicator 3 permits the latter to reciprocate in riding along the notches 7.

Fig. 2 indicates certain modifications. Here the indicator 3ª has a slotted pivotal mounting on the pivot 10 of the hub 14, to which is secured the weight 12 and weight arm 13. The hub 14 carries a pin or projection 22, corresponding in function to the arm 9 in Fig. 1, which engages with the side of the indicator 3ª, so as to move the latter to the right, but not to the left. As indicated, the coil 20 may be dispensed with, and the thermostat wire 15ª be itself a resistance element connected in the circuit. The construction shown in Fig. 1 is preferable, in that it provides for a greater movement of the indicator as the result of a slight movement of the thermal wire 15, and, moreover, provides for a greater heating effect through the coil 20. It will be obvious, however, that the two constructions shown are merely illustrative of the principles of the invention, which may be embodied in numerous forms.

What is claimed as new is:

1. In an electrical measuring instrument, the combination of a movable indicator, an operating member adapted to have operative connection with said indicator when moved in one direction only, means adapted to move said member in this direction, a circuit, and a plurality of wires under tension arranged and adapted to be heated and expanded simultaneously by current passing through said circuit, said wires having connection with said operating member and extending therefrom in opposite directions whereby contraction thereof moves said member in the inoperative direction, and means for heating said wires simultaneously by the current in said circuit.

2. In an electrical measuring instrument, the combination of a movable indicator, an operating member adapted to have operative connection with said indicator when moved in one direction only, means adapted to move said member in this direction, a pair of thermal wires under tension connected with said operating member, and extending therefrom in opposite directions, said wires being arranged and adapted to operate simultaneously whereby contraction of the wires moves said member in the inoperative direction, and a resistance coil inclosing said wires, said coil being arranged to be connected in the circuit to be measured and to thermally affect said wires simultaneously.

3. In an electrical measuring instrument, the combination of a movable indicator, a pivoted operating member adapted to have operative connection with said indicator when moved in one direction only, means adapted to move said member in this direction, supports positioned on opposite sides of the pivot of said operating member, a pair of thermal wires under tension connected to said supports and to said pivoted member at points on opposite sides of the axis thereof, said wires being arranged and adapted to expand or contract simultaneously under thermal action, and means whereby said wires are simultaneously heated electrically.

4. In an electrical measuring instrument, the combination of a movable indicator, a pivoted operating member adapted to have operative connection with said indicator when moved in one direction only, means adapted to move said member in this direction, spring supports positioned on opposite sides of the pivot of said operating member, a pair of thermal wires stretched between said supports and said operating member at points at opposite sides of the pivoted axis thereof, means whereby said thermal wires are heated and expanded by the current to be measured, and a compensating wire stretched between said spring supports.

5. In an electrical measuring instrument, the combination of a movable indicator, a pivoted operating member adapted to have operative connection with said indicator when moved in one direction only, means adapted to move said member in this direction, opposed spring supports, a thermal wire stretched between said supports under tension, being connected intermediate its length to said pivoted member at points at opposite sides of the pivotal axis thereof, whereby contraction of the wire overcomes said means and moves said member in the inoperative direction, means whereby said wire is heated by the current to be measured, and a compensating wire, substantially as described, also stretched between said spring supports.

6. In an electrical measuring instrument, the combination of a movable indicator, an operating member adapted to have operative connection with said indicator when moved in one direction only, an adjustable weight operative to move said member in this direction, a pair of coöperative thermal wires under tension connected with said operating member extending therefrom in opposite directions and arranged and adapted to expand simultaneously to permit said member to move said indicator when expanding and to overcome said weight and move said member in the reverse direction when contracting, and means whereby said wires are heated and expanded simultaneously by the current to be measured.

7. In an electrical measuring instrument, the combination of a circuit, a resistance-heated thermostat operated by current in said circuit, a pivoted indicator, connection between said thermostat and indicator whereby the latter is actuated through the expansion, but not through the contraction, of the thermostat, and a rack over which said indicator travels, the indicator having a loose pivotal mounting whereby it is permitted to reciprocate as it passes over the teeth of the rack.

Signed at New York in the county of Kings and State of New York, this 18th day of March, 1908.

MAURICE J. WOHL.
HARRY HERTZBERG.

Witnesses:
LEWIS W. HASKINS,
GEO. WELLING GIDDINGS.